(12) United States Patent
Morris

(10) Patent No.: US 7,769,266 B2
(45) Date of Patent: Aug. 3, 2010

(54) SLIDE AND TILT MECHANISM FOR A TELECOMMUNICATIONS PANEL

(75) Inventor: Stephen James Morris, Cheltenham (GB)

(73) Assignee: ADC GmbH, Berlin (DE)

( * ) Notice: Subject to any disclaimer, the term of this patent is extended or adjusted under 35 U.S.C. 154(b) by 384 days.

(21) Appl. No.: 11/821,570

(22) Filed: Jun. 22, 2007

(65) Prior Publication Data
US 2008/0106871 A1 May 8, 2008

Related U.S. Application Data

(60) Provisional application No. 60/815,985, filed on Jun. 23, 2006.

(51) Int. Cl.
*G02B 6/00* (2006.01)
(52) U.S. Cl. .................................... 385/135; 385/147
(58) Field of Classification Search ......... 385/134–139, 385/147
See application file for complete search history.

(56) References Cited

U.S. PATENT DOCUMENTS

| 5,071,211 | A | 12/1991 | Debortoli et al. |
|---|---|---|---|
| 5,167,001 | A | 11/1992 | Debortoli et al. |
| 5,490,229 | A | 2/1996 | Ghandeharizadeh et al. |
| 6,944,389 | B2 | 9/2005 | Giraud et al. |
| 7,031,588 | B2* | 4/2006 | Cowley et al. ............ 385/135 |
| 7,194,181 | B2* | 3/2007 | Holmberg et al. ......... 385/135 |
| 7,570,860 | B2* | 8/2009 | Smrha et al. ............. 385/135 |
| 2006/0018622 | A1 | 1/2006 | Caveney et al. |
| 2008/0085094 | A1 | 4/2008 | Krampotich |

FOREIGN PATENT DOCUMENTS

| EP | 1 079 638 A1 | 2/2001 |
|---|---|---|
| EP | 1 603 345 A2 | 12/2005 |
| WO | WO 2006/012389 A1 | 2/2006 |

* cited by examiner

*Primary Examiner*—Akm E Ullah
(74) *Attorney, Agent, or Firm*—Merchant & Gould P.C.

(57) ABSTRACT

A mechanism that provides access to a rear termination area of a telecommunications panel. The mechanism including a slide bar that permits the panel to laterally slide, and a tilt element the permits the panel to tilt. The slide bar and tilt element positioning the tilted termination panel over lower adjacent termination panels without contacting cables associated with the lower adjacent termination panels.

7 Claims, 2 Drawing Sheets

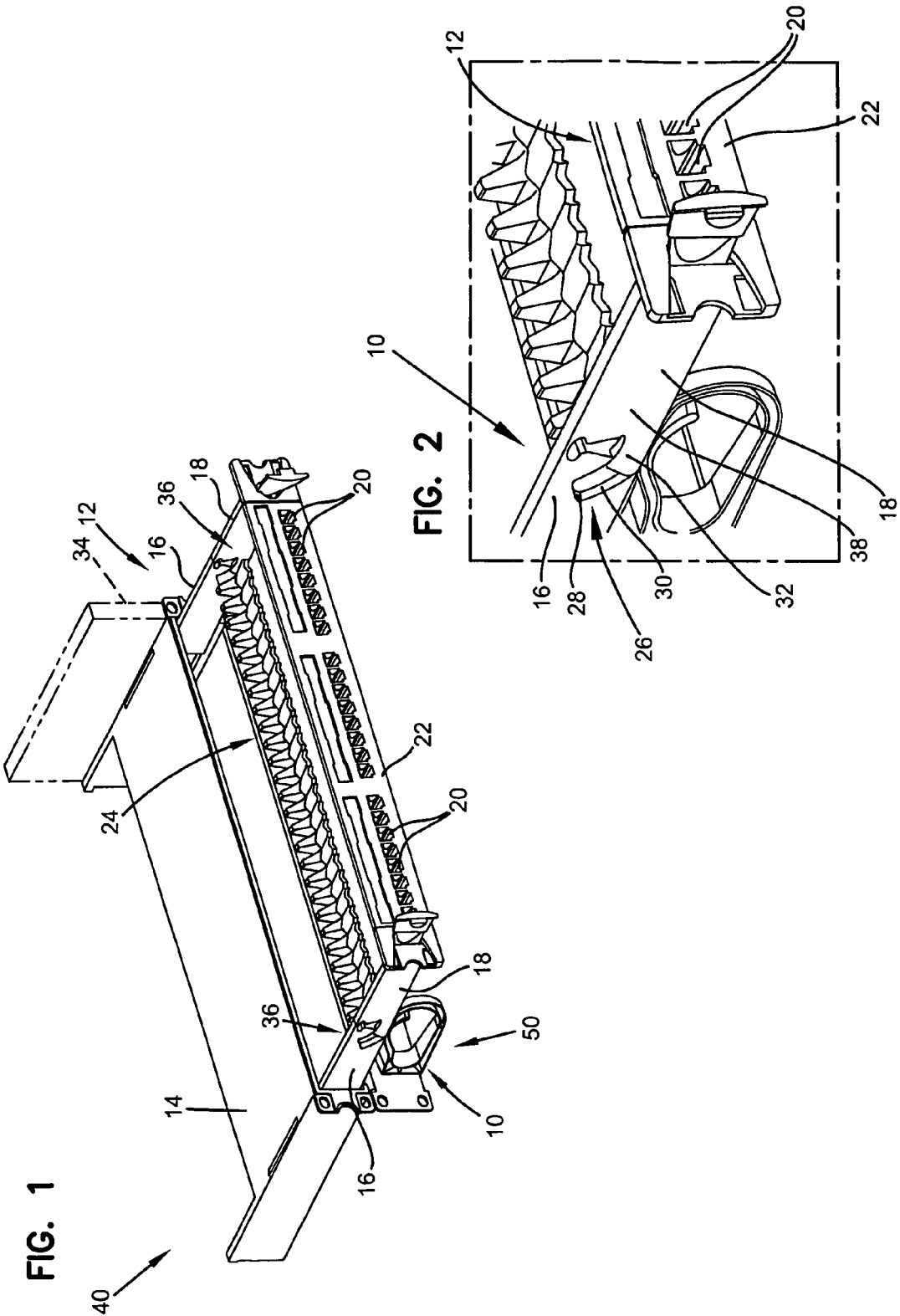

SLIDE AND TILT MECHANISM FOR A TELECOMMUNICATIONS PANEL

CROSS REFERENCE TO RELATED APPLICATIONS

This application claims the benefit of U.S. Provisional Application No. 60/815,985, filed Jun. 23, 2006; which application is incorporated herein by reference.

TECHNICAL FIELD

The present disclosure relates generally to devices for use in the telecommunications industry, and various methods associated with such devices. More particularly, this disclosure relates to telecommunications panels.

BACKGROUND

Telecommunications panels are used to provide electrical connections in a wide variety of telecommunication applications. The panels are often housed within and mounted to racks and cabinets, for example. Many racks and cabinets include frames having defined positions at which panels may be mounted.

Panels are often used for the termination of cables. Termination connectors are provided on the panels for cable terminations. Often the connectors are located in a termination area at the rear of the panel.

Terminating a cable to a panel is typically done in one of two ways. In one method, a sliding mechanism is used to access the termination area at the rear of the panel. The sliding mechanism permits the panel to slide out from the frame, similar to a drawer, and can be designed to drop or angle the panel down to aid in cable termination. In another method, an outrigger is used. As will be described in greater detail, the outrigger is a tool or fixture that is affixed to the frame when performing panel terminations.

One problem that arises with the use of conventional sliding mechanisms relates to the panels located below the panel being terminated. The panel located below (the lower panel) can be an active panel. An active panel is a panel having working patching cables connected to ports located on the front face of the panel. In this situation, when the sliding mechanism is used, the upper panel (the panel being terminated) drops down against the patching cables of the lower panel, which can cause damage to the lower panel patching cable. Contacting the patching cable of the lower active panel also obstructs and reduces the tilt angle of the upper panel, and therefore diminishes the benefit of the sliding mechanism.

In the alternative, the lower panel can be a jumper bar panel. A jumper bar panel is a panel having support rings built onto the panel to support patch cables of adjacent panels. Similar to the previous situation, when the sliding mechanism is used, the upper panel drops down against the patching cables of the lower panel, which can cause damage to the patching cables. Contacting the patching cable of the lower jumper bar panel also obstructs and reduces the tilt angle of the upper panel, and again diminishes the benefit of the sliding mechanism.

The outrigger method of accessing the rear termination areas of panels has disadvantages also. While the outrigger negates the need for a sliding mechanism, the outrigger introduces an additional tool that requires attachment to the frame when performing panel terminations. The tool is a stand or support frame that is affixed to the frame at or below the panel. Once the outrigger is in place, the panel is then pulled out from the frame, and placed upon the outrigger. When the panel rests upon the outrigger, the panel is positioned ideally to aid in cable termination. That is, the outrigger is designed to span over the lower panel, hence allowing the upper panel to tilt to an un-obstructed and more ideal angle for termination purposes. Attaching the additional outrigger tool to the frame each time cable termination is to be performed, however, is time consuming.

In general, improvement has been sought with respect to such devices and methods.

SUMMARY

The present disclosure relates to a mechanism for accessing a rear termination area of a telecommunications panel. The mechanism angles the panel to provide access to the rear termination area without the use of an outrigger tool, while still preventing damage to cables of lower adjacent panels. A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 1 is a front perspective view of a mechanism for accessing a rear termination area of a telecommunications panel, according to the principles of the present disclosure;

FIG. 2 is an enlarged view of a portion of the mechanism of the telecommunications panel of FIG. 1;

DETAILED DESCRIPTION

Figure 3:
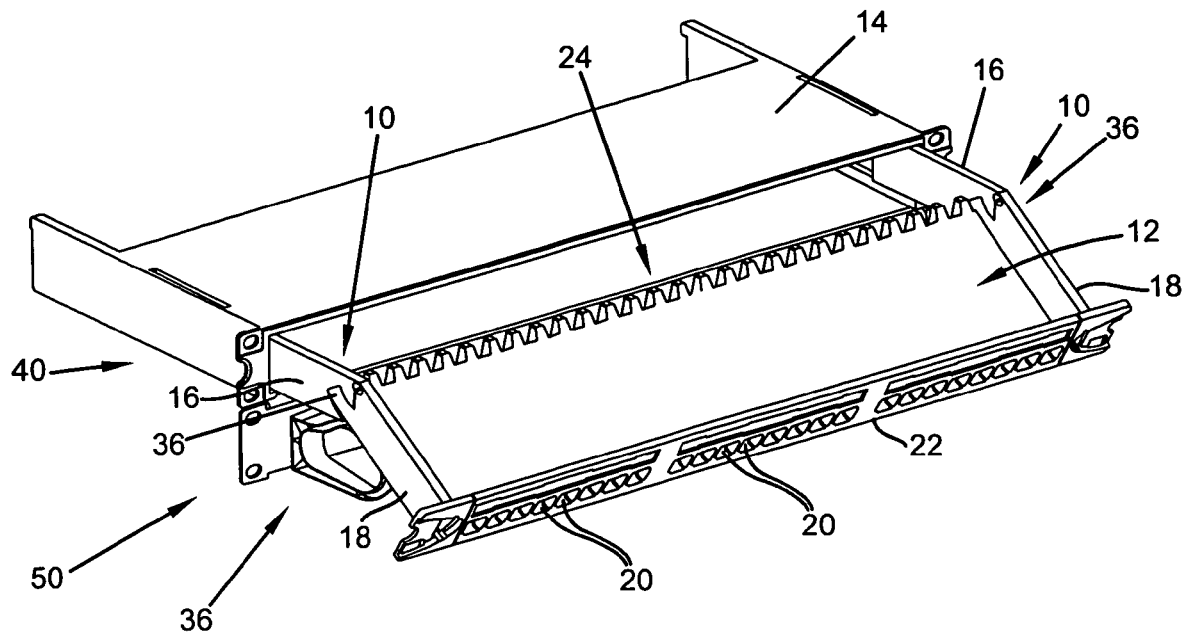
FIG. 3 is a front perspective view of the telecommunications panel of FIG. 1, shown in a tilted position.

Reference will now be made in detail to various features of the present disclosure that are illustrated in the accompanying drawings. Wherever possible, the same reference numbers will be used throughout the drawings to refer to the same or like parts.

FIGS. 1-4 illustrate one embodiment of a mechanism 10 that simplifies the procedure for terminating panels. The mechanism 10 is provided on a panel assembly 40. The panel assembly 40 includes a termination panel 12 and a chassis 14. The termination panel 12 is slidably interconnected to the chassis 14. The chassis 14 is, in turn, fixedly mounted to a telecommunications frame 34 (partially and schematically represented in FIG. 1). The frame 34 often includes a number of panels positioned or stacked upon one another. Fiber cables (not shown) couple or interconnect to the panels 12 at connection locations 20 located on a front face plate 22 of the panels 12. Because the connection locations 20 are located at the front of such panels, termination areas 24 are typically provided at the rear of the panels. Other types of panel arrangements can incorporate the present mechanism 10 in accordance with the principles disclosed.

Figure 4:
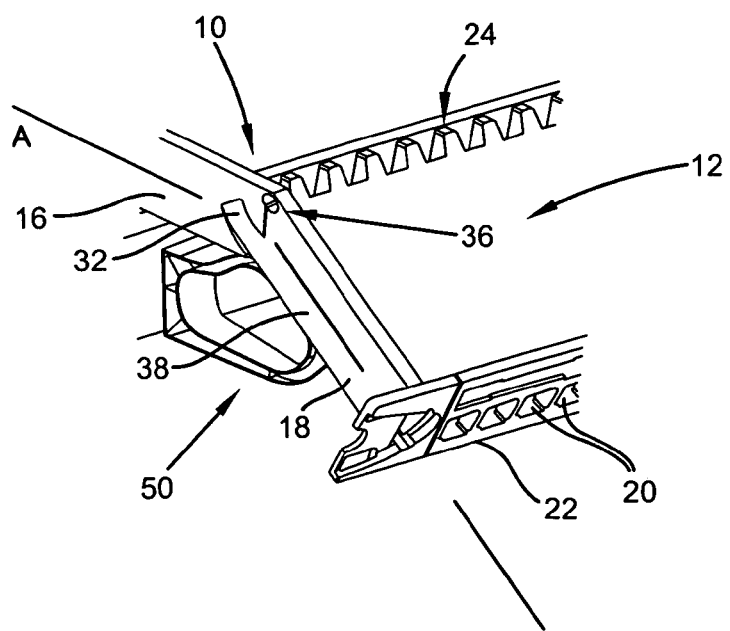
FIG. 4 is an enlarged view of a portion of the mechanism of the tilted telecommunications panel of FIG. 3.

When the panel 12 is mounted to the frame 34, access to the rear termination area 24 is available only from the front of the panel 12. The present mechanism 10 permits the panel 12 to first slide outward, as shown in FIGS. 1 and 2; and then tilt at a desired angle A downward, as shown in FIGS. 3 and 4. This allows the rear termination area 24 of the panel 12 to be accessed more quickly than methods involving outriggers, and makes the rear termination area 24 more accessible than methods involving conventional slide mechanisms that are obstructed by lower panel cables.

Referring to FIG. 2, the present mechanism 10 generally includes a slide bar 16 and a tilting element 18. The slide bar 16 and the tiling element 18 are directly connected to one another at a hinged joint 36 (see also FIGS. 3 and 4). While the present disclosure describes the interaction of a single slide bar and corresponding tilting element, it can be understood that the mechanism includes first and second slide bars 16 as well as first and second tilting elements 18 located at opposite ends of the termination panel 12.

The slide bar 16 provides a sliding interconnection between the panel 12 and the chassis 14. In particular, the slide bar 16 permits the panel 12 to slide horizontally out from the chassis 14, for example, from a first lateral position to a second lateral position (the second lateral position shown in FIGS. 1 and 2). In each of the first and second lateral positions, the termination panel 12 is in a generally horizontal position.

The tilting element 18 of the mechanism 10 permits the panel 12 to tilt to the desired angle A (FIG. 4) for rear termination purposes. In particular, the termination panel 12 tilts from the generally horizontal position shown in FIGS. 1 and 2 to a second tilted position shown in FIGS. 3 and 4. The front face plate 22 directly connected to the termination panel 12 correspondingly tilts so as not to obstruct access to the rear termination area 24.

The mechanism 10 is configured so that the termination panel 12 spans over any cabling terminated at or retained by a lower panel (e.g. jumper bar panel 50) during termination procedures. In particular, each of the slide bar 16 and the tilting element 18 are designed such that when the panel 12 is tilted, the panel does not contact any cabling associated with lower active panels or lower jumper bar panels.

More specifically, the slide bar 16 is constructed to extend the panel 12 out a desired distance from the frame 34. The slide bar 16 also provides a stop 26 that limits the tilt of the panel 12 to a desired angle. In the illustrated embodiment, the stop 26 is defined by an end 28 of a slot 30 formed in the slide bar 16. The tilting element includes a main portion 38 to which the termination panel 12 is mounted, and an arm or lobe 32. When tilting the panel 12, the arm 32 of the tilting element 18 rides within the slot 30 of the slide bar 16 until the arm 32 contacts the end 28 of the slot 30 (as shown in FIG. 4).

The stop 26 is arranged to limit the tilt of the panel 12 to the desired angle A, allowing the panel to be positioned in an ideal termination position while still providing clearance of the lower panel 50. In alternative embodiments, the desired angle may be different than that shown. The different desired angle can be provided by lengthening or shortening the slot 30 of the slide bar 16 so that the location of the stop 26 is changed. The stop 26 of the slide bar 16 supports the panel 12 while tilted in the desired termination angle.

The slide bar 16 and the tilting element 18 of the disclosed mechanism 10 are designed to form part of the overall construction of the panel 12, thereby eliminating the need for additional tools or fixtures when performing cable terminations. Accordingly, installation times or the time for performing termination procedures is improved. In addition, because the mechanism 10 forms part of the overall panel construction, the depth of the panel can be kept to a minimum to free up valuable facility space.

The above specification provides a complete description of the present invention. Since many embodiments of the invention can be made without departing from the spirit and scope of the invention, certain aspects of the invention reside in the claims hereinafter appended.

What is claimed is:

1. A telecommunications panel, comprising:
a) a chassis;
b) a termination panel positionable in a first generally horizontal position and a second tilted position; and
c) a slide bar interconnected between the chassis and the termination panel, the slide bar permitting the termination panel to slide horizontally between first and second lateral positions relative to the chassis;
d) wherein the termination panel includes a tilting element located at an end of the termination panel, the tilting element including an arm that slides within a slot formed in the slide bar, the arm and slot cooperating to limit the angle of the termination panel when the termination panel is positioned in the second tilted position.

2. The panel of claim 1, further including a front face plate directly connected to the termination panel, the front face plate being correspondingly tilted when the termination panel is tilted to the second tilted position.

3. The panel of claim 1, wherein the slide bar and the tilting element are interconnected to one another at a hinged joint.

4. The panel of claim 1, wherein the angle of the termination panel in the second tilted position is limited by contact between the arm and a stop.

5. The panel of claim 4, wherein the stop is defined by an end portion of the slot formed in the slide bar.

6. A telecommunications system, comprising:
a) a telecommunications frame; and
b) a panel assembly including a chassis fixedly mounted to the telecommunications frame and a termination panel interconnected to the chassis, the termination panel having a rear cable termination area and a front face plate, the panel assembly further including a mechanism that provides access to the rear cable termination area of the termination panel, the mechanism including:
i) a slide bar interconnected between the chassis and the termination panel, the slide bar permitting the termination panel to slide horizontally between first and second lateral positions relative to the chassis, the slide bar defining a slot having a stop end; and
ii) a tilting element interconnected to the slide by at a hinged joint, the tilting element including an arm that slides within the slot such that the termination panel tilts between a generally horizontal position and a tilted position;
iii) wherein tilting movement of the termination panel is limited by contact between the arm and the stop end of the slot.

7. The system of claim 6, wherein the panel assembly is a first panel assembly, the system further including a second panel assembly located beneath the first panel assembly, the tilting movement of the termination panel of the first panel assembly being limited to provide clearance of the second panel assembly.

* * * * *